United States Patent
Shalvi et al.

(10) Patent No.: US 6,859,899 B2
(45) Date of Patent: Feb. 22, 2005

(54) METHOD FOR DATA PACKET ACQUISITION USING SPLIT PREAMBLE

(75) Inventors: Ofir Shalvi, Herzlia (IL); Daniel Wajcer, Moshav Beit-Yehoshua (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/858,116

(22) Filed: May 15, 2001

(65) Prior Publication Data

US 2002/0172187 A1 Nov. 21, 2002

Related U.S. Application Data

(60) Provisional application No. 60/204,172, filed on May 15, 2000.

(51) Int. Cl.[7] .................................... G06F 11/00
(52) U.S. Cl. ................ 714/701; 714/761; 714/762; 714/787; 714/788; 714/731; 714/744; 370/350
(58) Field of Search ............... 714/761–762, 714/787–788, 731, 744, 701; 370/350

(56) References Cited

U.S. PATENT DOCUMENTS 5,898,684 A * 4/1999 Currivan et al. ............ 370/350
6,449,288 B1 * 9/2002 Chari et al. ................. 370/470
6,646,980 B1 * 11/2003 Yamamoto et al. ......... 370/208

OTHER PUBLICATIONS

IEEE 802.14a Workgroup, IEEE 802.14a High–Capacity Physical Layer Specification Draft 1 Revision 4, 1999, pp. 52–53.*
IEEE 802.14a Workgroup, Ballot Decision2, May 28, 1999, IEEE 802.14 Working Group Archive, p. 22 and p. 23.*
Dabecki et al, IEEE 802.3z Gigabit Ethernet UTP5 Proposal V1.0, Sep. 9–11, 1996, pp. 9–10.*
Dabecki et al, IEEE 802.3z Gigabit Ethernet UTP5 Proposal V2.0, Nov. 11–14, 1996, p. 18.*
http://www.mathworld.com , Average Power, 1962, http://mathworld.wolfram.com/AveragePower.html.*

* cited by examiner

Primary Examiner—Guy J. Lamarre
(74) Attorney, Agent, or Firm—Wade James Brady, III; Frederick J. Telecky, Jr.

(57) ABSTRACT

A data packet type communication system utilizes packet framing wherein preambles are split into two or more subpreambles, separated by a number of data or a priori known symbols. A receiver chooses among individual and combined subpreamble options for determining synchronization. When a noise impulse prevents detection of one subpreamble, the impulse is detected, and preamble correlation proceeds using an unaffected subpreamble. When no impulse is detected, combined subpreambles are used.

12 Claims, 2 Drawing Sheets

| P | P | P | P | X | X | X | X | X | X | X | X | P | P | P | P | D | D | D | D | D | D | D | D | D | D | D | D | D | D | D | D |

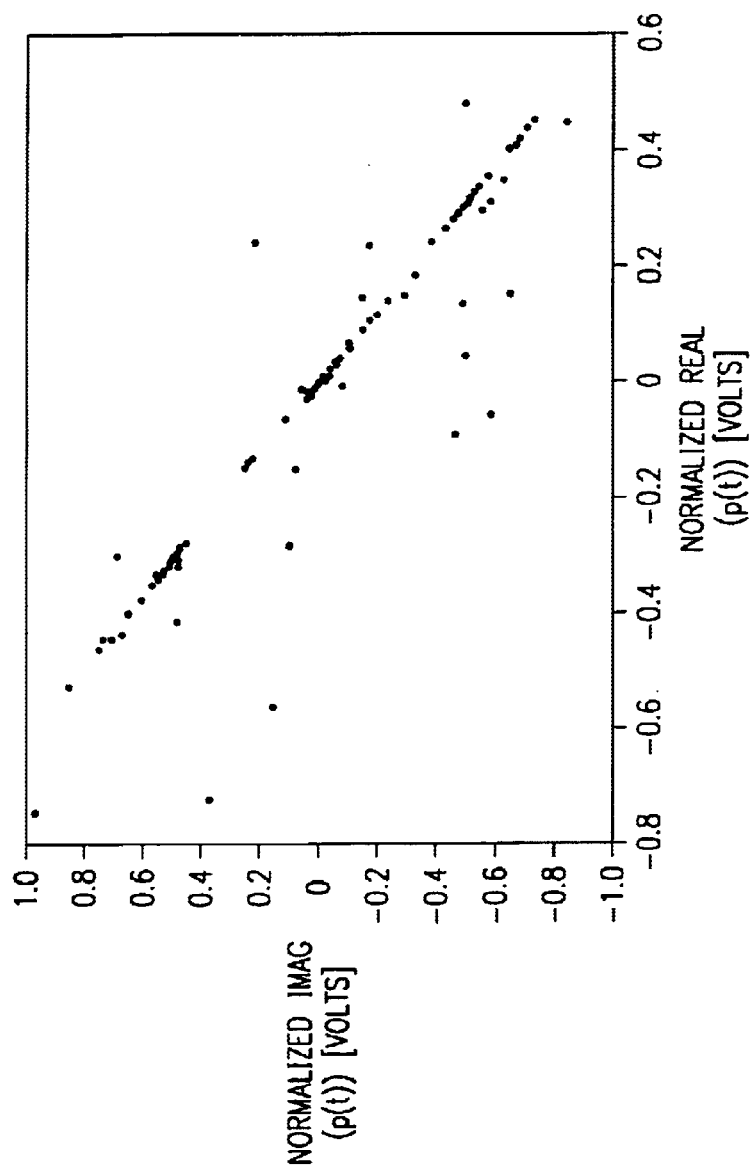

METHOD FOR DATA PACKET ACQUISITION USING SPLIT PREAMBLE

CROSS-REFERENCE TO RELATED APPLICATIONS

This application claims the benefit under 35 U.S.C. §119 of provisional application Ser. No. 60/204,172, filed May 15, 2000, the contents of which, together with the contents of the references cited below, are incorporated herein by reference.

BACKGROUND OF THE INVENTION

This invention relates generally to data communications, and more particularly to robust methods for packet acquisition in packet type data communications.

In packet type data communications, data is transferred from a data transmitter to a data receiver across a transmission medium in the form of variable or constant length data packets. The packets are ordered into frames to include a "payload" or data field, as well as a plurality of "header" or non-data fields which provide synchronizing and other housekeeping or identifying information useful for routing and processing the packets. Packet communication may be bursty in nature, with little or no signal activity occurring along the transmission medium during idle periods between packet transfers. The timing of packet transmissions is often irregular, and generally determined by data needs.

A well-known packet type data communication is the Ethernet system, one implementation of which is the 10 BASE-T system described in the IEEE standard 802.3. Different framing formats are used for different Ethernet implementations. An example of framing structure for an Ethernet system is given in Hioki, *Telecommunications* (1990 Prentice Hall $3^{rd}$ ed.), at 430–433. The frame has a multiple byte preamble field, followed by destination address, source address, and data fields. Additional fields may include type fields, starting delimiters, length fields, and frame check sequence fields. In the described framing, the data field is between 46 and 1500 bytes in length, with total packet size between 72 bytes (576 bits) and 1526 bytes (12,208 bits) in length. A common preamble is used that comprises seven bytes of alternating 1s and 0s (starting with 1 and ending with 0). This particular preamble pattern produces a periodic waveform by the Manchester encoding circuit and allows the receiver to achieve frame synchronization with the packet.

Data is transmitted through coaxial cable, twisted wire pair or other transmission medium in packets using any of a variety of methods for coding data onto an analog medium, including amplitude modulation, frequency modulation and phase modulation. Two commonly used forms of phase modulation are binary phase shift keying (BPSK) and quadrature phase shift keying (QPSK). BPSK uses a two-phase modulation scheme—an in-phase signal and a 180 degree out-of-phase signal. During each baud (i.e., digital symbol transmission cycle), the transmitter sends one of the two signals. The phase sent determines the value of the bit transmitted (1 or 0). A single binary bit per baud is conveyed from transmitter to receiver during each baud time. QPSK uses a four phase modulation—an in-phase signal, a 180 degree out-of-phase signal, a ±90 degree phase signal, and a −90 degree phase signal. During each baud, the transmitter sends one of the four signals. Two binary bits per baud are thus conveyed during each baud time. See, e.g., U.S. Pat. No. 5,289,467. Another commonly used modulation method is quadrature amplitude modulation (QAM). QAM provides more bits per symbol transmission cycle by combining phase shift and amplitude keying to provide bit encoding within an in-phase and quadrature component (I-Q) modulated constellation space. A 16-bit QAM format, for example, uses 12 different phases and three different amplitudes to represent 16 possible carrier states, or four bits per baud cycle. See, *Telecommunications*, above, at 332–333.

Data is encapsulated or "packed" into frames at the transmitter, and decapsulated or "unpacked" from the frames at the receiver. The packet preamble provides a mechanism for establishing synchronization ("sync") between the packing and unpacking operations. A preamble generator at the transmitter creates a preamble for each of the data packets and a preamble decoder at the receiver decodes the preamble of the data packet and determines sync for the packet. The preamble generated by the preamble generator may include a carrier detect interval, a carrier sync interval, a bit sync interval and a word sync pattern. The carrier detect interval is used by the receiver to identify the beginning of a packet. The carrier sync interval is used by a carrier synchronization circuit to identify the phase of the incoming transmission. The bit sync section of the preamble is used by a bit (baud) synchronization circuit to indicate the positions of baud symbols within the packet. The word sync pattern is used by the preamble decode to identify the beginning of a baud grouping, such as a forward error correcting (FEC) word. The remainder of the packet is transmitted and received as a collection of FEC words. See. e.g., U.S. Pat. No. 5,289, 476.

The preamble functions as a synchronization symbol. To achieve frame synchronization or sync, each frame has a header with a predefined format and grouping of pseudo-random number sequences comprising symbols. The formatted signal including the preamble is transmitted to the receiver using the chosen modulation scheme. At the receiver, a correlator, utilizing a synchronization detection algorithm, is designed to match a predetermined symbol pattern with the received signal. Once the frame synchronization is established, the channel is characterized and the data symbols are recovered.

Noise is generated by the random motion of free electrons and molecular vibrations in all electronic components and conductors. The cumulative effect of all random noise generated internal and external to the data communication system, averaged over a period of time, is referred to as Gaussian noise, or additive white Gaussian noise (AWGN). (The noise is called "white" because it has frequencies distributed over the entire frequency spectrum, similar to the way white light includes all visible wavelengths of color.). See, e.g., *Telecommunications*, above, at 13–17 and 603.

Specific examples of packet data transmission include multipoint-to-point packet networks (such as CATV HFC upstream channels) and multipoint-to-multipoint packet networks (such as home phone wire networks). In both, a preamble (i.e. a sequence of a priori known symbols) is appended at the beginning of each data packet. Preamble symbols are usually of low constellations (such as BPSK or QPSK) while the payload (the data symbols) can be of higher constellations. The known preamble symbols allow for timing, amplitude and phase recovery and thereby acquisition of the data packets in the channel. The estimation error of these parameters in additive white Gaussian noise (AWGN) channels is inversely proportional to the length of the preamble and to the average power of the preamble symbols. Adequate estimation of these parameters is crucial for packet acquisition. When the estimation error is too high, the packet is lost.

The optimal estimator for AWGN channels is a correlator—a device that calculates the cross-correlation between the received signal and the preamble symbols. The estimate of the timing, amplitude and phase is determined according to the time, amplitude and phase of the peak of the signal at the correlator output. The use of matched filters correlators for synchronization and codeword identification is described in Stremler, *Introduction to Communication Systems* (1990 Addison-Wesley 3rd ed.), at 431–445. Both tapped delay line and time correlator realizations are illustrated.

SUMMARY OF THE INVENTION

The invention provides methods for improving the robustness of packet acquisition in packet type data communications. Aspects of the invention include packet framing using a split preamble; an impulse method for detecting split preamble framed packets; and a method for reliable acquisition of preambles comprising alternating symbols. The first two aspects can significantly improve the performance of packet networks in channels that suffer from impulse noise and/or burst noise. The third aspect overcomes the problem of erroneous timing estimation when the preamble has many alternating symbols.

BRIEF DESCRIPTION OF THE DRAWINGS

Embodiments of the invention have been chosen for purposes of illustration and description, and are described with reference to the accompanying drawings, wherein:

FIG. 1 shows a split preamble structure in accordance with the invention;

FIG. 2 shows a phase-shifted real signal (with noise) in the quadrature plane;

DETAILED DESCRIPTION OF THE INVENTION

Figure 3:
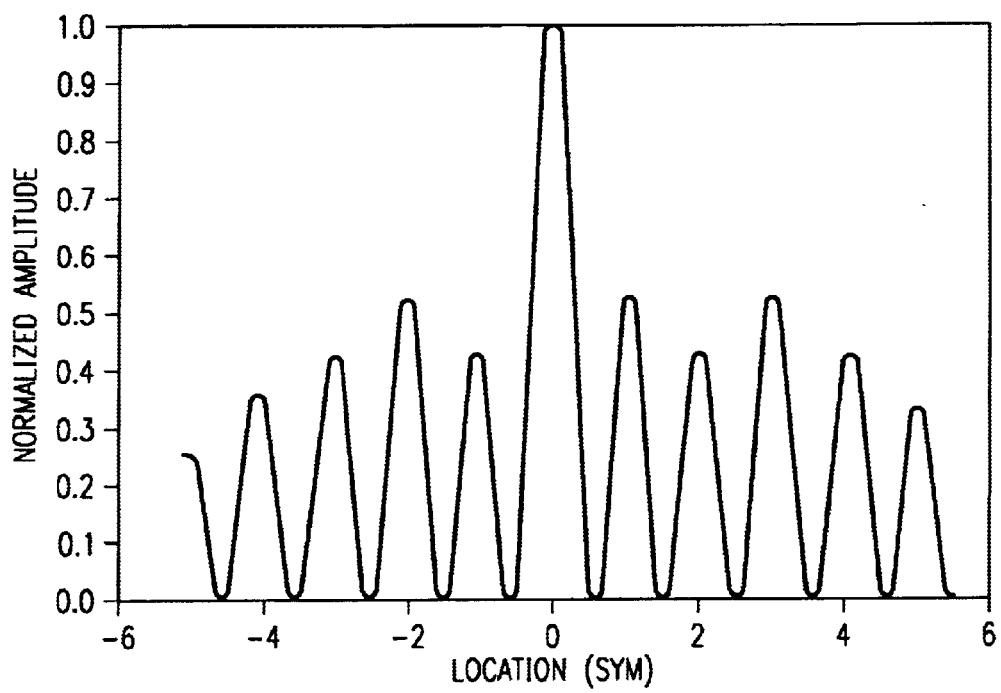
FIG. 3 shows a correlator output for an alternating preamble.

The invention provides for utilizing a split preamble for mitigating impulse (burst) noise. A common severe channel impairment (in addition to AWGN) is impulse (or burst) noise. This impairment is characterized by short high-power impulses of noise. The impulse power may be higher than the received signal and the impulse length may be several symbols (up to a few tens of symbols in extreme cases). If such impulse hits some of the preamble symbols, it corrupts the parameters' estimation, and may result in the loss of the whole packet.

The invention proposes splitting the preambles into two or more subpreambles that are separated by a number of symbols that is larger than the typical noise impulse length. Therefore, a single impulse cannot corrupt all the subpreambles. The symbols between the subpreambles may be data (random) symbols or a priori known symbols (e.g., other non-data header symbols). The symbols of the subpreambles may be (but do not have to be) equal. The length of each part of the split preamble should be large enough to allow adequate acquisition when one of the subpreambles is lost. When one of the subpreambles is hit by an impulse, the receiver should detect the impulse, and use only the other subpreambles for acquisition. A novel impulse detector for common preambles is described below. When no impulse is detected, all the subpreambles should be used for acquisition for optimal correlator performance. If the symbols between the subpreambles are a priori known, they can also, optionally, be used by the correlator.

A structure of a split preamble with two subpreambles is illustrated in FIG. 1. The symbols of the subpreambles are denoted by P, the data symbols are denoted by D and the symbols between the subpreambles are denoted by X. The X symbols can be either data or a priori known symbols. In the latter case, the symbols denoted by P and X are effectively one long preamble.

The invention provides an impulse detection method for a preamble that is split into multiple subpreambles. When the split preamble method is used, for example, with two subpreambles, the receiver has to choose between three acquisition result options: The results of each of the two subpreambles considered separately and the result using the whole preamble symbols (including, optionally, the symbols between the subpreambles if they are a priori known). The optimal criterion is as follows:

$$\alpha_i = \frac{1}{T_i^2} \cdot \int_{t_i}^{t_i+T_i} |n(t)|^2 \, dt,$$

where $T_i$ is the preamble or subpreamble duration in option i, $t_i$ is the preamble or subpreamble start time, $n(t)$ is the total channel noise, and $\alpha_i$ is the average noise power normalized to the preamble length. The preamble option with the lowest $\alpha$ should be chosen.

When the impulse noise power is very high (compared to the signal power and the AWGN), this criterion reduces to the following rule: If one of the subpreambles was hit by an impulse, then the other subpreamble should be used. Otherwise, all preamble symbols should be used for optimal parameter estimation. Therefore, to best exploit the benefits of the split preamble method, a reliable channel noise estimator should be used (in order to calculate $\alpha_i$ or at least to detect an impulse event).

This section describes a reliable, low-complexity impulse detector suitable for use in passband communication systems wherein the preambles are phase-shifted real signals (see equation below). Such preambles are widely used in communication systems. For example, in CATV HFC upstream channels employing the DOCSIS standard, the preamble symbols are often chosen to be a phase-shifted real signal in order to simplify the correlator. There is no penalty in performance for such choice.

When the preamble signal is a phase-shifted real signal, the preamble signal can be described by the following equation:

$$p(t) = e^{j\phi} \cdot \sum_n P[n] \cdot g(t - nT);$$

where $P[n]$ and $g(t)$ are real. Therefore, the imaginary component of $\tilde{p} = p(t) \cdot e^{-j\phi}$ is zero. If the received signal is $r(t)$, then the imaginary component $r(t) \cdot e^{-j\phi}$ contains only the noise components during the preamble transmission time. Therefore, it can be used for estimation of the noise level during the preamble (or subpreamble) transmission. FIG. 2 shows a phase-shifted real signal (with impulse noise) in the quadrature plane.

The invention proposes to perform the following operations for a two subpreamble implementation example:

a. Perform the parameter estimation with each of the three options described above (i.e. each subpreamble and the whole preamble);

b. For each option, calculate the following parameter:

$$\beta_i = \frac{1}{T_i^2} \cdot \int_{t_i}^{t_i+T_i} |r(t) \cdot e^{-j\hat{\phi}_i}|^2 \, dt;$$

where $T_i$ is the preamble or subpreamble duration in each option, $t_i$ is the preamble or subpreamble start time, and $\hat{\phi}_i$, is the estimated phase shift in each option.

c. Choose the results of the option with the lowest β.

The described approach is, of course, applicable in a similar manner, with appropriate option extensions and modifications, to the detection of data packets having split preambles comprising more than two subpreambles. Likewise, use of the imaginary part of $r(t) \circ e^{-j\phi}$ finds application in other implementations also, for any type noise detection (impulse/burst noise, AWGN or other), with or without also using the specific equation for β. Usage may even be extended to other applications beyond those involving just split preamble detection, as described above.

A method for reliable acquisition of preambles with alternating symbols is also provided. In many systems, the preamble consists of alternating symbols, i.e., consecutive symbols that have the same amplitude and opposite signs (e.g. {1,−1,1,−1,1,−1 . . . 1), followed by a short unique word. These types of preambles allow good timing estimation because they provide many zero crossings. It can also be shown that they provide lower Craner-Rao lower bound for the timing error estimation. For example, this type of preamble is used in a digital video broadcasting (DVB) return cable channel (ETSI ETS 300 800). However, when a correlator (which is the optimal estimator) is used, there are many peaks at the correlator output with amplitude close to the main (highest) peak's amplitude. Therefore, the correlator might choose the wrong peak, a choice that would cause the loss of the packet. FIG. 3 shows an example of the correlator output without noise. The preamble sequence in this case consists of 12 alternating symbols and a 4 symbol unique word (which is not alternating). It can be seen that the peaks adjacent to the main peak have relatively high amplitude. Therefore, channel noise may cause misdetection of the main peak. This problem is especially severe when the signal is sampled at (or slightly higher than) the Nyquist rate. In this case, the samples may not include the peaks, which would make the location of the main peak even less distinctive.

This invention proposes, in one aspect, the usage of a suboptimal correlator that measures the cross-correlation between the received signal and a signal that is a slightly modified version of the transmitted signal. Appropriate choice of this signal will emphasize the main peak relative to the adjacent peaks. Therefore, the probability for choosing the wrong peak is significantly lower. However, the performance of the correlator may be somewhat degraded because the correlation is not with the transmitted signal. In many cases, such performance degradation is acceptable. However, if optimal performance is required, then after choosing the correct peak using the proposed method, the correlation can be performed again without the modification of the preamble signal. This time, the location of the main peak is known with small estimation error (much smaller than the distance between adjacent peaks), so there is no hazard of choosing the wrong peak.

Figure 4:
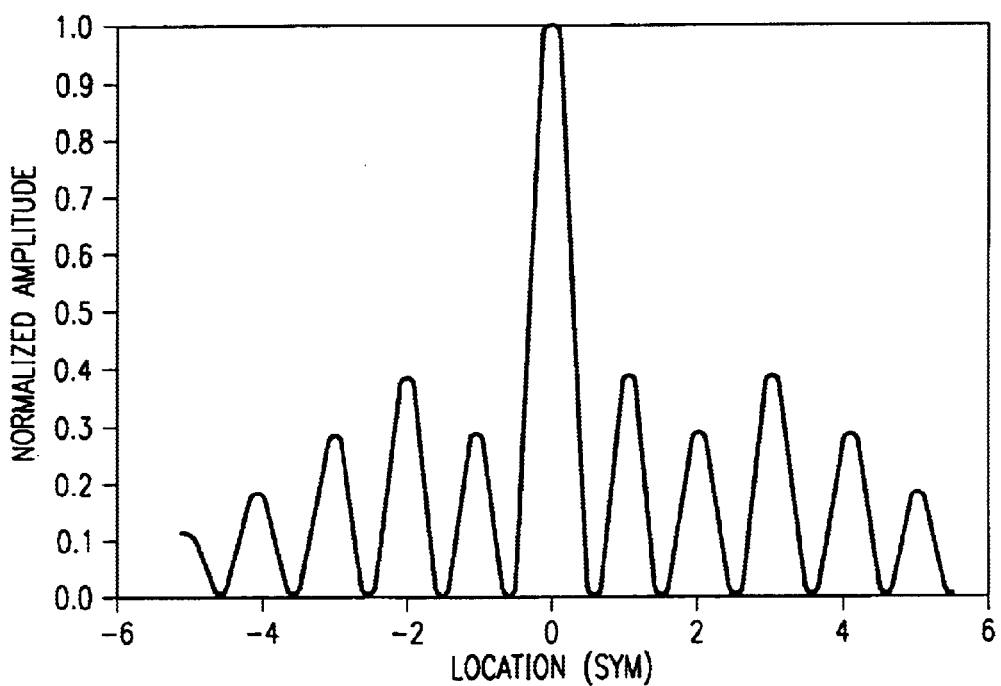
FIG. 4 shows a corresponding correlator output using a modified correlation signal.

The effect of the proposed method is shown in FIG. 4. In this case, two preamble symbols (out of 14) were changed. It can be seen that the ratio between the main peak and the adjacent peaks is higher than in FIG. 3. The degradation performance is less than 3dB.

Those skilled in the art to which the invention relates will appreciate that various substitutions and modifications may be made to the described embodiments, without departing from the spirit and scope of the invention as defined by the claims.

What is claimed is:

1. A method for acquiring packet synchronization in a packet type communication network, comprising the steps of:
   providing a data packet having a framing format including a preamble split into a plurality of subpreambles of non-interleaved symbols followed by data symbols;
   for individual subpreamble and for combined subpreamble options, determining the following parameter:

$$\beta_i = \frac{1}{T_i^2} \cdot \int_{t_i}^{t_i+T_i} |r(t) \cdot e^{-j\hat{\phi}_i}|^2 \, dt;$$

where $T_i$ is the preamble or subpreamble duration in each option, $t_i$ is the preamble or subpreamble start time, $\beta_1$ is the approximation of $\alpha_1$, and $\hat{\phi}_i$ is the estimated phase shift in each option; and
   determining synchronization using correlation with a priori known symbols using the subpreamble or combined subpreamble option which provides the lowest β.

2. The method of claim 1 wherein said plurality of subpreambles is two, the two subpreambles being separated in time by other non-data symbols.

3. The method of claim 2 wherein said other symbols are one of other data signals or a priori known symbols.

4. The method of claim 3 wherein said preambles are separated by a number of non-data symbols greater than a predetermined typical noise impulse length.

5. The method of claim 2 wherein said preambles are separated by a number of non-data symbols greater than a predetermined typical noise impulse length.

6. The method of claim 1 wherein said preambles are separated by a number of non-data symbols greater than a predetermined typical noise impulse length.

7. A method for acquiring packet synchronization in a packet type communication network, comprising the steps of:
   providing a data packet having a framing format including a preamble split into a plurality of subpreambles of non-interleaved symbols followed by data symbols;
   determining whether any of said subpreambles have been affected by at least one of impulse noise or burst noise; and
   determining synchronization using the subpreambles of said plurality of subpreambles which have not been affected by said at least one of impulse noise or burst noise.

8. The method of claim 7 wherein said plurality of subpreambles is two, the two subpreambles being separated in time by other non-data symbols.

9. The method of claim 8 wherein said other symbols are one of other data signals or a priori known symbols.

10. The method of claim 9 wherein said preambles are separated by a number of non-data symbols greater than a predetermined typical noise impulse length.

11. The method of claim 8 wherein said preambles are separated by a number of non-data symbols greater than a predetermined typical noise impulse length.

12. The method of claim 7 wherein said preambles are separated by a number of non-data symbols greater than a predetermined typical noise impulse length.

\* \* \* \* \*